United States Patent
Levonas et al.

(10) Patent No.: US 6,879,625 B1
(45) Date of Patent: Apr. 12, 2005

(54) SYSTEM AND METHOD FOR PROVIDING CANCELLATION OF INTERFERENCE IN A REPEATER CONFIGURATION WITH REMOTE LOOP POWERING

(75) Inventors: Robin Levonas, Red Bank, NJ (US); Ehud Langberg, Wayside, NJ (US)

(73) Assignee: GlobespanVirata, Inc, Red Bank, NJ (US)

( * ) Notice: Subject to any disclaimer, the term of this patent is extended or adjusted under 35 U.S.C. 154(b) by 566 days.

(21) Appl. No.: 09/863,164

(22) Filed: May 21, 2001

Related U.S. Application Data

(60) Provisional application No. 60/206,069, filed on May 22, 2000.

(51) Int. Cl.[7] .............................................. H04B 17/02
(52) U.S. Cl. ........................ 375/211; 375/222; 370/492
(58) Field of Search ............................. 455/63.1, 11.1, 455/67.13, 570, 7, 114.2; 375/211, 212, 213, 214, 215; 370/492, 286; 379/348, 341, 406.01, 416, 417

(56) References Cited

U.S. PATENT DOCUMENTS

| | | | | |
|---|---|---|---|---|
| 3,735,056 A | * | 5/1973 | Martin et al. ................ 375/214 |
| 3,868,484 A | * | 2/1975 | Bolton et al. ............. 340/425.2 |
| 6,173,021 B1 | * | 1/2001 | Bingel et al. ................ 375/346 |
| 6,181,791 B1 | * | 1/2001 | Murphy .................. 379/406.01 |
| 6,236,664 B1 | * | 5/2001 | Erreygers .................... 370/492 |
| 6,658,049 B1 | * | 12/2003 | McGhee et al. ............. 375/211 |
| 2002/0191552 A1 | * | 12/2002 | Watkinson ................... 370/286 |

\* cited by examiner

*Primary Examiner*—Nay Maung
*Assistant Examiner*—Raymond Dean
(74) *Attorney, Agent, or Firm*—Thomas, Kayden, Horstemeyer, & Risley

(57) ABSTRACT

A system and method for providing cancellation of interference in a repeater configuration is disclosed, wherein the repeater is located between a first endpoint and a second endpoint. A data signal received from the first end point is amplified in accordance with an amount of power required to drive the data signal to the second endpoint. Local echo introduced by the repeater is then removed from the amplified data signal. Coupled signals introduced by the repeater are then removed after which the data signal is transmitted to the second endpoint.

28 Claims, 5 Drawing Sheets

SYSTEM AND METHOD FOR PROVIDING CANCELLATION OF INTERFERENCE IN A REPEATER CONFIGURATION WITH REMOTE LOOP POWERING

CROSS-REFERENCES TO RELATED APPLICATIONS

This application claims the benefit of U.S. Provisional Application No. 60/206,069, filed May 22, 2000, and entitled "Method of Canceling Interference in a Repeater Configuration with Remote Loop Powering," which is incorporated herein by reference in its entirety.

FIELD OF THE INVENTION

The present invention relates generally to broadband networks, and more particularly, to cancellation of interference within a repeater.

BACKGROUND OF THE INVENTION

With the advancement of technology and the need for instantaneous information, the ability to transfer digital information from one location to another, such as from a central office (CO) to a customer premises (CP), has become more and more important. Allowing for increasing data transmission rates has become a requirement, as opposed to an option.

As part of the system responsible for proper transmission and reception of data in a broadband network, one end-point within the network may comprise the following. An analog front end that (AFE) interfaces between an analog transmission medium, such as an analog telephone line, and digital processing circuits. The AFE, among other functions, converts a digital signal into a continuous time analog signal. Particular to the case of a digital subscriber line (DSL) AFE with an integrated line driver, the AFE also puts this converted signal on a two-wire pair, or twisted pair. The AFE circuit performs this function by using the combination of a digital-to-analog converter and an analog-to-digital converter. The digital-to-analog converter receives digital signals from a digital signal processor (DSP), and converts them to analog signals, upon which the analog signals are transmitted to a line driver. The analog-to-digital converter receives analog signals, converts them to digital signals, and furnishes them to the DSP. The AFE may also incorporate other elaborate analog signal processing. Once the analog signal is transmitted to the line driver, the line driver drives the analog signal through the two-wire pair in accordance with a required power particular to the application considered and the type of line driven.

The distance for transferring information over a twisted pair is typically large. As an example, the distance from a residence to a central office may be in excess of 15,000 feet. Unfortunately, twisted pairs attenuate signals in proportion to both line length and frequency. As the line length and frequency increases, the performance of specific DSL transmission, such as, but not limited to, asynchronous DSL (ADSL), decreases. Therefore, there is a need for preventing attenuation when transferring digital information over long distances. In addition, line drivers usually do not provide amplification of the signals to be transmitted, resulting in line drivers not being a potential vehicle used for minimizing attenuation.

To assist in addressing the above mentioned information transfer difficulty, repeaters have been introduced into networking systems. Repeaters provide a means for expanding the distance for transferring information over a twisted pair, without allowing attenuation. Typically, repeaters demodulate and regenerate a signal received from a first end point (CO) and send the signal out to a second endpoint (CP) on a line such as a twisted pair. This process allows received information to be transmitted over longer distances without attenuation.

Due to repeaters typically being located distant from any power source, power is provided to the repeaters via the twisted pair, which is otherwise referred to as line powering. Specifically, a DC current is transmitted to the repeater via the twisted pair. The power may also be transmitted to additional repeaters that are connected via a twisted pair. Typically, a series of inductors are located within a repeater to provide a DC path such that all repeaters receive necessary power to perform demodulation and regeneration.

Unfortunately, typical repeaters suffer from direct coupling of signals from one side of the repeater to the other side as explained herein below. Ordinarily, repeaters comprise a first and second DSP, wherein signals are received by the first DSP and demodulated, after which the demodulated signal is transmitted to the second DSP that re-modulates the demodulated signal. The re-modulated signal is then transmitted to a destination endpoint or another repeater via the twisted pair. A power feed, or DC power path, provides the path through which noise is coupled from one DSP to the next DSP. This coupling is otherwise referred to as crosstalk. The effect of the crosstalk results in poor repeater performance due to the inability of the receiving part of the repeater to effectively cancel uncorrelated input signals. The level of crosstalk can be somewhat reduced by the inductors located within the repeater, which provide a single pole low pass filter whose cutoff frequency is inversely proportional to the value of the inductor. Hence, the larger the inductor, the lower the cutoff frequency. In a repeater arrangement where space is limited, large inductors are not practical, nor desirable.

BRIEF SUMMARY OF THE INVENTION

In light of the foregoing, the preferred embodiment of the present invention generally relates to a system and method for canceling interference in a repeater.

Generally, describing the structure of the interference cancellation system, the system, which is located between a first and second endpoint, utilizes an echo canceler for canceling echo within the cancellation system and a repeater canceler that cancels coupled signals within said cancellation system.

The present invention can also be viewed as providing a method for canceling interference within a repeater located between a first endpoint and a second endpoint. In this regard, the method can be broadly summarized by the following steps: amplifying a data signal received from the first end point in accordance with an amount of power required to drive the data signal to the second endpoint; removing local echo from the amplified data signal; removing coupled signals introduced by the repeater; and transmitting the data signal to the second endpoint.

The invention has numerous advantages, a few of which are delineated hereafter as examples. Note that the embodiments of the invention, which are described herein, possess one or more, but not necessarily all, of the advantages set out hereafter.

One advantage of the invention is that it cancels interference within a repeater, where space is limited.

Other features and advantages of the present invention will become apparent to one with skill in the art upon examination of the following drawings and detailed description. It is intended that all such additional features and advantages be included herein within the scope of the present invention, as defined by the accompanying claims.

BRIEF DESCRIPTION OF THE SEVERAL VIEWS OF THE DRAWINGS

The present invention will be more fully understood from the detailed description given below and from the accompanying drawings of the preferred embodiments of the invention, which, however, should not be taken to limit the invention to the specific embodiments, but are for explanation and better understanding. Furthermore, the drawings are not necessarily to scale, emphasis instead being placed upon clearly illustrating the principles of the present invention. Finally, like reference numerals in the figures designate corresponding parts throughout the several drawings.

DESCRIPTION OF THE PREFERRED EMBODIMENTS

The interference cancellation system of the present invention can be implemented in software, firmware, hardware, or a combination thereof. In the preferred embodiment of the invention, which is intended to be a non-limiting example, the system is implemented in hardware. However, if the system is implemented in software, the software may be executed by a computer, for example, but not limited to, a server, a personal computer, workstation, minicomputer, or mainframe computer.

The software portion of the system, which may comprise an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Figure 1:
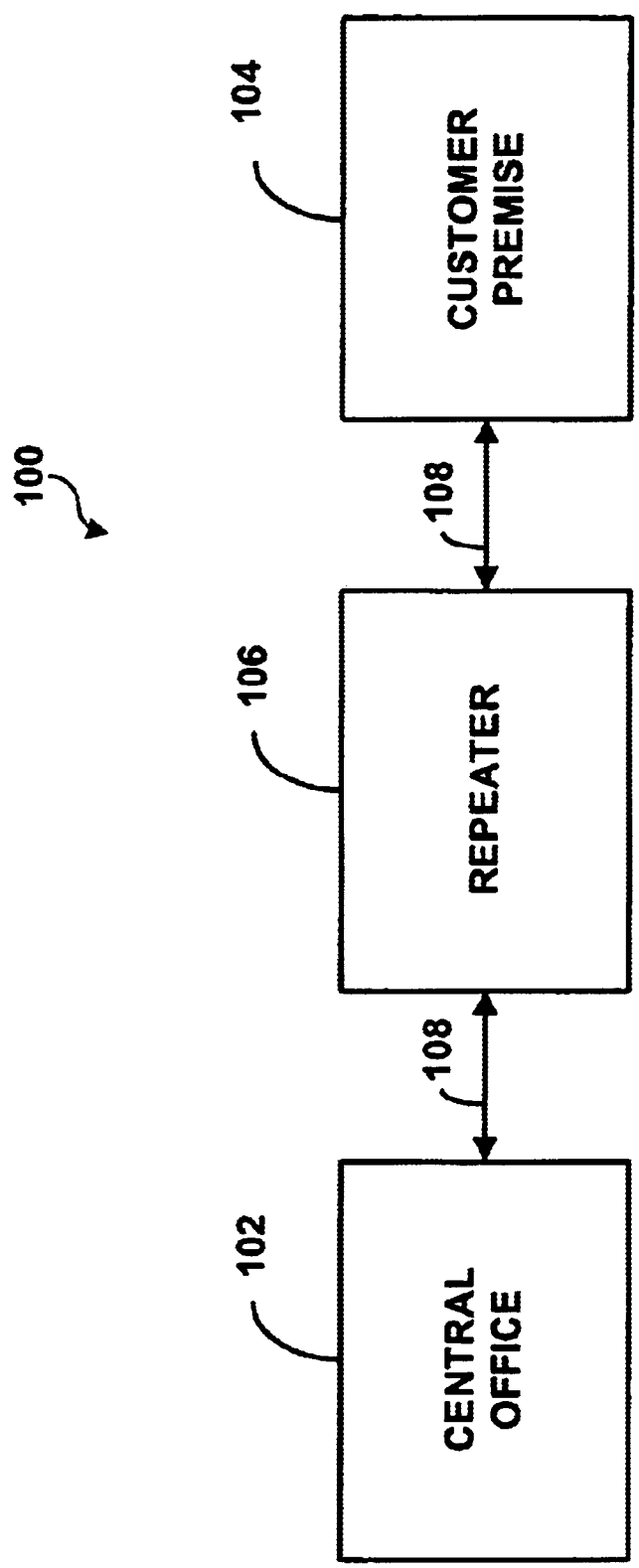
FIG. 1 is a block diagram illustrating a typical data transmission path from a central office to a customer premise, via a repeater.

Referring now to the drawings, wherein like reference numerals designate corresponding parts throughout the drawings, FIG. 1 is a block diagram illustrating a typical data transmission path from a first endpoint (hereinafter, central office) to a second endpoint (hereinafter, customer premise), located within a data communication network 100. It should be noted that the first and second endpoints need not be a central office (CO) and customer premise (CP), respectively. Instead, data transmission may be from a first CP to a second CP, from a first modem to a second modem, or from a first transceiver to a second transceiver.

As illustrated by FIG. 1, a CO 102 transmits data that is to be received by a CP 104, to a repeater 106, via a communication line 108, such as, but not limited to, a twisted pair. The repeater 106 demodulates and re-modulates the received signal to allow for data transmission over a long distance, via another communication line 108. The re-modulated signal is then transmitted to the CP 104. Alternatively, the re-modulated signal may be transmitted to a second, third, or fourth repeater. In fact, the number of repeaters located in the path between the CO 102 and the CP 104 are only limited by power transmission factors.

Figure 2:
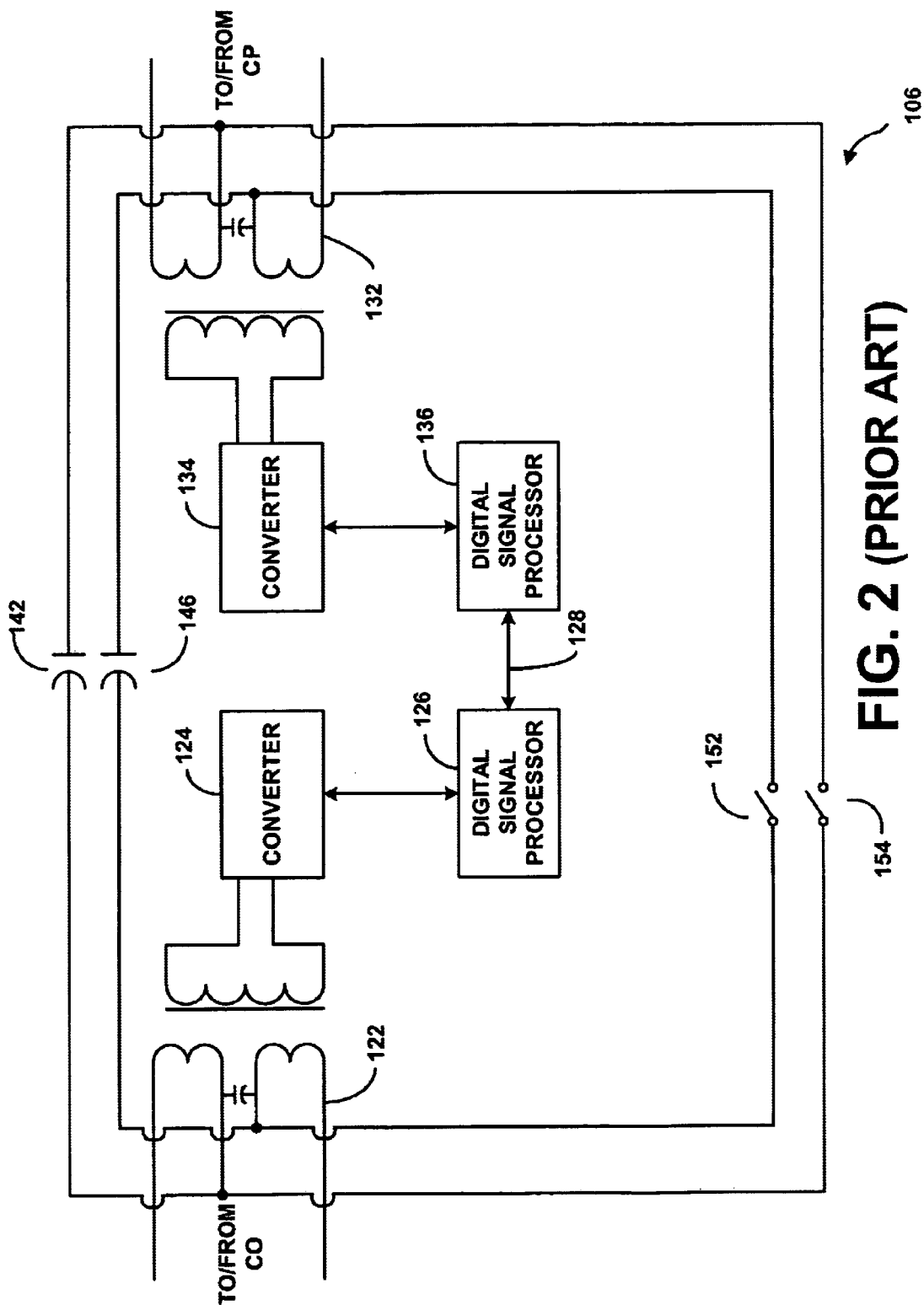
FIG. 2 further illustrates a prior art repeater that may be used within the network illustrated by FIG. 1.

FIG. 2 further illustrates a prior art repeater 106 that may be used within the network 100 of FIG. 1, including relationships within the repeater 106. Considering the transmission of data from the CO 102 (FIG. 1) to the repeater 106, data signals are received by the repeater 106 via a first transformer 122. Transformers within the repeater 106 divide a twisted pair into two separate wire pairs wherein the first pair is used for transmitting, and the second pair is used for receiving. Therefore, an alternative device may be used in replacement of the transformers, which performs the dividing function.

The data signals are then transmitted to a first converter 124 that converts the received analog signals into digital signals. It should be noted that the present disclosure assumes that data signals received from the CO 102 (FIG. 1) are analog signals, however, the repeater 106 may instead receive digital data signals, in which case converters would not be a necessity. Samples of the digital signals are then transmitted to a first DSP 126. The first DSP 126 receives the digital signals and demodulates the signals derive data that was initially sent by the CO 102 (FIG. 1).

The demodulated signals are then transmitted, via a communication link, such as a serial bus 128, to a second DSP 136, which re-modulates the signals received from the first DSP 126. Samples of the re-modulated signals are then transmitted to a second converter 134. The second converter 134, in turn, converts the re-modulated signals into analog signals for transmission to the CP 104 (FIG. 1), after passing through a second transformer 132.

Considering the transmission of data from the CP 104 (FIG. 1) to the repeater 106, data signals are received by the repeater 106, from the CP 104 (FIG. 1), via the second transformer 132. The signals are then transmitted to the second converter 134, which converts the received analog signals into digital signals. The digital signals are then transmitted to the second DSP 136. The second DSP 136 receives the digital signals and demodulates the signals to derive data that was initially sent by the CP 104 (FIG. 1).

The demodulated signals are then transmitted, via the serial bus 128, to the first DSP 126, which re-modulates the signals received from the second DSP 136. Samples of the re-modulated signals are then transmitted to the first converter 124. The first converter 124, in turn, converts the re-modulated signals into analog signals for transmission to the CO 102 (FIG. 1), after passing through the first transformer 122.

Tone through capacitors 142, 146 are located within the repeater 106 to assure that the path from the first endpoint, or CO 102 (FIG. 1), to the last endpoint, or CP 104, provides proper signal continuity. Proper signal continuity may be tested by many different methods. One method is by transmitting a tone from the CO 102 (FIG. 1) to the CP 104 (FIG. 1) and listening for the tone at the CP 104 (FIG. 1). If the transmitted tone is received at the CP 104 (FIG. 1) then the path used for transmitting power from the CO 102 (FIG. 1) to the CP 104 (FIG. 1) provides proper continuity, thereby confirming that all repeaters between the CO 102 (FIG. 1) and the CP 104 (FIG. 1) are receiving appropriate amounts of power.

Unfortunately, the tone through capacitors 142, 146 also couple signals from one converter to the other converter. Specifically, when the first converter 124 transmits a signal to the CO 102 (FIG. 1), the signal is transmitted to the first transformer 122, after which it is transmitted to the CO 102 (FIG. 1). The signal is also coupled by the tone through capacitors 142, 146 to the second transformer 132. As a result, the signal is coupled into the second converter 134, which, in turn, transmits the coupled signal to the second DSP 136, thereby causing crosstalk.

The effect of the crosstalk results in poor repeater 106 performance due to inability of receiving parts of the repeater 106 to effectively cancel uncorrelated input signals. As mentioned herein above, the level of crosstalk can be somewhat reduced by introducing inductors to the repeater 106. Inductors provide a DC path for power transmission and also block high frequency modem signals between channels that result in crosstalk. Unfortunately, large inductors are not practical, nor desirable due to size and power consumption.

In addition, switches 152, 154 are typically used within a repeater to provide downstream power to additional repeaters located between the CO 102 (FIG. 1) and the CP 104 (FIG. 1). As an example, if a second repeater is connected to the second transformer 132 via a twisted pair, the switches 152, 154 are closed so that the second repeater receives power from the CO 102 via the first repeater 106. Unfortunately, similar to the capacitors 142, 146, the switches 152, 154 also provide coupling of signals.

Figure 3:
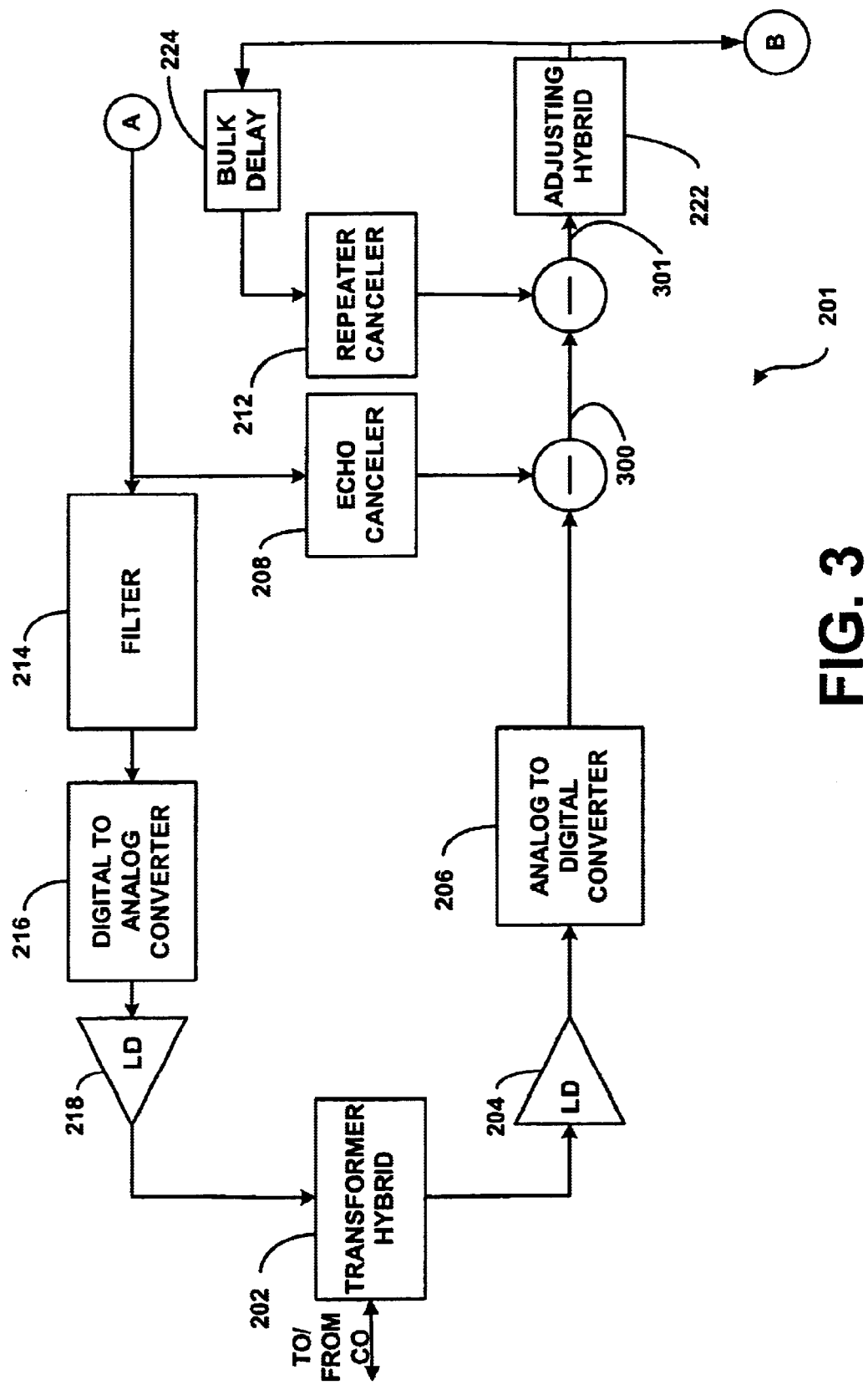
FIG. 3 is a block diagram illustrating a first part of a repeater that cancels crosstalk in accordance with the preferred embodiment of the invention.
Figure 4:
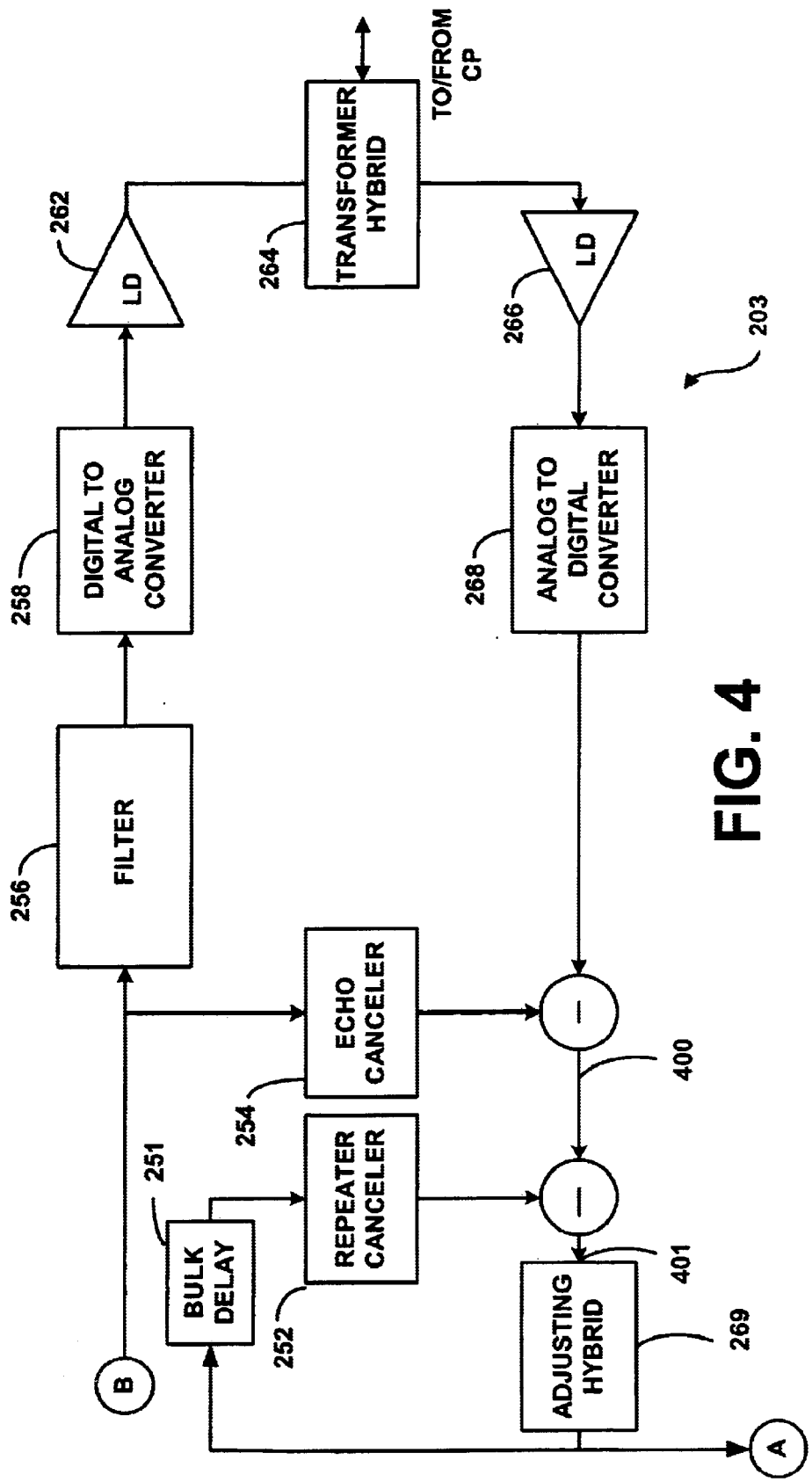
FIG. 4 is a block diagram illustrating a second part of a repeater that cancels crosstalk in accordance with the preferred embodiment of the invention.

FIG. 3 is a block diagram illustrating a repeater 200 that cancels crosstalk, also referred to as repeater signals, in accordance with the preferred embodiment of the invention. Specifically, FIG. 3 illustrates a first part 201 of the repeater 200, while FIG. 4 illustrates a second part 203 of the repeater 200. It should be noted that the detailed description provided hereinafter with reference to FIGS. 3 and 4 are provided in accordance with data transmission from the CO 102 (FIG. 1), to the repeater 200, to the CP 104 (FIG. 1), and then from the CP 104 (FIG. 1) to the repeater 200, to the CO 102 (FIG. 3).

As shown by FIG. 3, analog data signals are received by the repeater 200 via a first transformer hybrid 202. It should be noted that the following provides data transmission assuming that the received data is in analog form, however, one skilled in the art will appreciate that the data signals transmitted may instead be in digital form.

The transformer hybrid 202 is used to separate data transmission from the communication line 108 (FIG. 1), which is used to both transmit and receive, into two separate paths within the repeater 106, wherein one path is used to transmit data and one path is used to receive data. The received data is then transmitted to a first line driver 204. The first line driver 204 then amplifies the received data signal in accordance with an amount of power required to drive the amplified analog signal through the twisted pair 108 (FIG. 1) to the CP 104 (FIG. 1) or another repeater.

The amplified data is then transmitted to a first analog to digital converter 206 that converts the received analog signals into digital signals. At this point, the resulting digital signal that is transmitted from the first analog to digital converter 206 comprises the received digital signal from the CO 102 (FIG. 1), a repeater signal caused by the tone through capacitors 142, 146 (FIG. 2) and switches 152, 154 (FIG. 2), and local echo that has been introduced by the repeater 200.

A first echo canceler 208 is connected to the path of transmission of the digital signal within the repeater so that locally generated echo is removed from the digital signal. In accordance with the preferred embodiment of the invention, echo cancellation may be performed by any known method of cancellation. The received digital signal, after echo cancellation, comprises the signal from the CO 102 (FIG. 1), plus the repeater signal caused by the tone through capacitors 142, 146 (FIG. 2) and switches 152, 154 (FIG. 2).

A first repeater canceler 212 is connected to the receive path to provide repeater cancellation in accordance with the preferred embodiment of the invention. Preferably, a reference signal is used to assist in removing the repeater signal. The reference signal is a data signal received from the second part 203 (FIG. 4) of the repeater 106 which is being transmitted from the CP 104 (FIG. 1) to the CO 102 (FIG. 1). The algorithm used to effectively remove the repeater signal is similar to that used to cancel local echo, as explained in detail hereinbelow.

Returning to FIG. 3, the digital signal is then transmitted to a first receive processor 222, which adjusts gain control, equalizes the signal, and performs decision processing. Those skilled in the art will appreciate that the functions performed by the receive processor 222 are standard functions that are performed within a full-duplex echo canceling modem. Data that is transmitted out of the first receive processor 222 is the original digital data that was transmitted by the CO 102 (FIG. 1).

Figure 5:
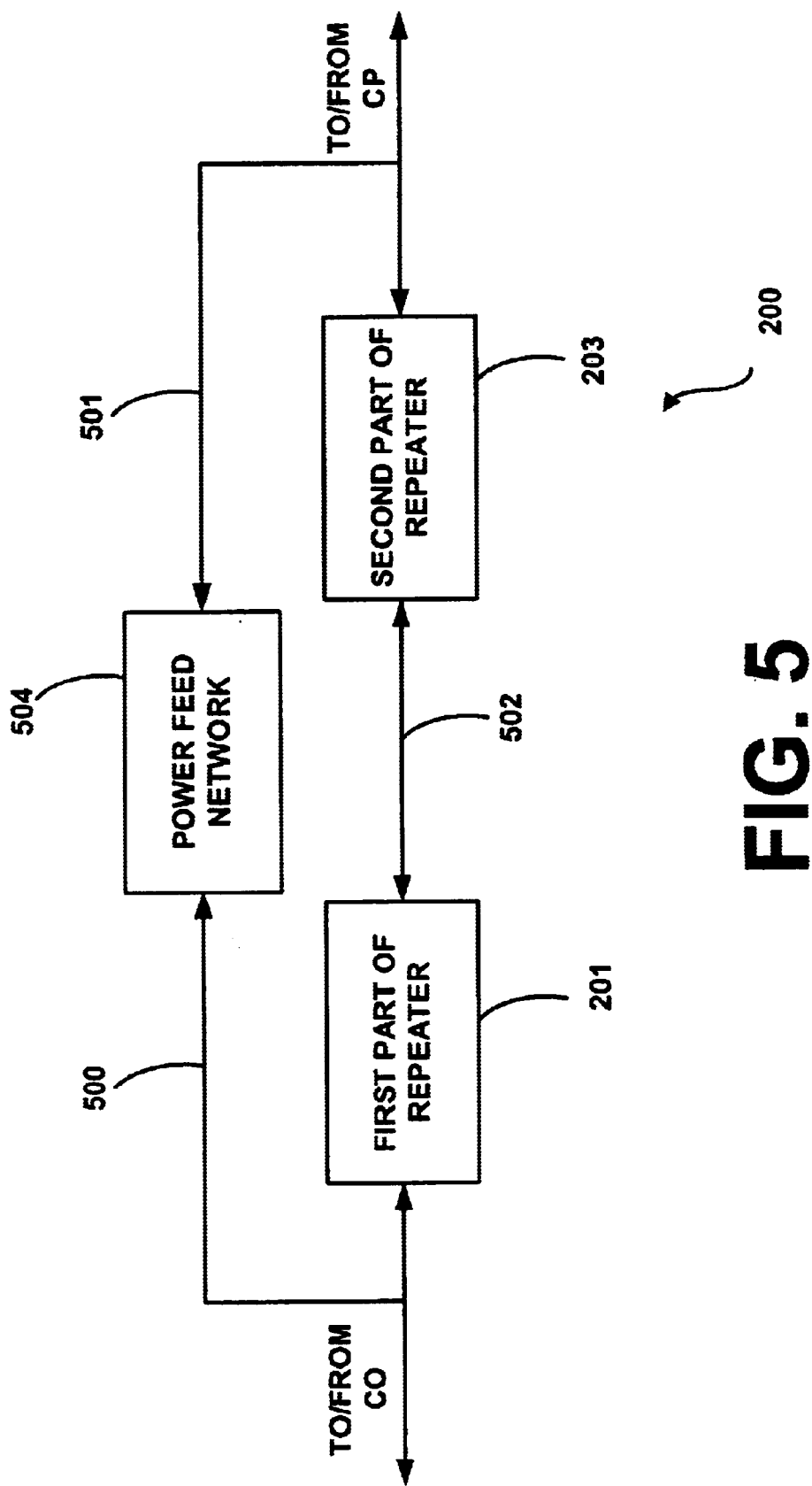
FIG. 5 is a block diagram further illustrating the first and second parts of the repeater of FIGS. 3 and 4 and their relationship with a power feed network.

Samples of the original digital data are transmitted to a first bulk delay device 224. The bulk delay device 224 provides a delay to the original digital data before the data is transmitted to the first repeater canceler 212. The bulk delay device 224 is preferably a digital shift register. Essentially, the first bulk delay device 224 is used to match the delay into the first repeater canceler 212 with the repeater signal caused by the tone through capacitors 142, 146 (FIG. 2) and switches 152, 154 (FIG. 2). The delayed digital data is then used by the first repeater canceler 212 to remove the repeater signal in a manner similar to the cancellation of echo by the first echo canceler 208. FIG. 5, provided hereinbelow, provides further discussion of repeater signal removal.

After removal of the repeater signal from the data signal received from the CO 102 (FIG. 1), the original signal transmitted by the CO 102 (FIG. 1) is obtained without echo or the repeater signal. The received signal from the CO 102 (FIG. 1) is then transmitted to the second part 203 of the repeater 200 as shown by FIG. 4 (designated as B).

In addition, a first filter 214, a first digital to analog converter 216 and a second line driver 218 are located within the first part 201 of the repeater 200. Functionality performed by the abovementioned filter 214, converter 216, and line driver 218 is similar to that described with reference to a second filter 256 (FIG. 4), second digital to analog converter 258 (FIG. 4) and third line driver (FIG. 4) 262, described hereinbelow with reference to transmission of the data signal from the CO 102 (FIG. 1) to the CP 104. Therefore, reference should be made to the disclosure for FIG. 4 to support functionality of the abovementioned filter 214, converter 216, and line driver 218.

Referring to the block diagram of FIG. 4, the CO data signal is received as an input to a second bulk delay 251, and then to a second repeater canceler 252 and a second echo canceler 254. The received data signal from the CO 102 (FIG. 1) is then transmitted to a second filter 256 to assist in adjusting the frequency and amplitude of the received CO signal before transmission to the CP 104 (FIG. 1). An example of a filter that may be used in accordance with the preferred embodiment of the invention includes a pulse-shaping filter. The pulse-shaping filter 256 forces the received data to have a specific frequency and amplitude in accordance with a protocol type supported by the network. As an example, the repeater 200, CO 102 (FIG. 1), and CP 104 (FIG. 1) may use the DSL protocol, the HDSL protocol, or any XDSL protocol.

After filtering, the data signal from the CO 102 (FIG. 1) is transmitted to a second digital to analog converter 258 for conversion of the digital signal to an analog signal. The analog signal is then transmitted to a third line driver 262 for amplification of the analog signal. The amplified analog data signal is then transmitted to a second transformer hybrid 264, which transfers the amplified data signal to the CP 104 (FIG. 1), or another repeater, via the communication line 108 (FIG. 1). Preferably, the communication line 108 (FIG. 1) is a twisted pair.

The following refers to the transmission of data from the CP 104, or another repeater, to the CO 102. Data signals are received by the second part 203 of the repeater 200 via the second transformer hybrid 264. A fourth line driver 266 then amplifies the received data signal in accordance with the amount of power required to drive the amplified analog signal through the twisted pair 108 (FIG. 1) to the CO 104 (FIG. 1) or another repeater.

The amplified data is then transmitted to a second analog to digital converter 268 that converts the received analog signals into digital signals. The resulting digital signal that is transmitted out of the second analog to digital converter 268 at this point comprises the received digital signal from the CP 102 (FIG. 1), a repeater signal caused by the tone through capacitors 142, 146 (FIG. 2) and switches 152, 154 (FIG. 2), and local echo that has been introduced by the repeater 200. A second echo canceler 254 is connected to the receive path so that echo is removed from the digital signal.

After echo cancellation has been performed on the digital signal, the digital signal comprises the received signal from the CP 104 (FIG. 1) and the repeater signal (crosstalk) caused by the tone through capacitors 142, 146 (FIG. 2) and switches 152, 154 (FIG. 2). The second repeater canceler 252 is connected to the receive path to provide repeater cancellation in accordance with the preferred embodiment of the invention. Preferably, the reference signal used by the second repeater canceler 252 is the data signal received from the CO 102 (FIG. 1) after repeater cancellation and echo cancellation has been performed. Removal of the repeater signal is described in detail with reference to FIG. 5 provided hereinbelow.

After removal of the repeater signal from the data signal received from the CP 104 (FIG. 1) the original signal transmitted by the CP 104 (FIG. 1) is obtained without echo or the repeater signal. The received signal from the CP 104 (FIG. 1) is then transmitted to the first part 201 of the repeater 200 as shown by FIG. 3 (designated as A) where filtering, conversion, and amplification are performed similar to that performed on a data signal transmitted from the CO 102 (FIG. 1) to the CP 104 (FIG. 1).

The following provides a detailed discussion of how the repeater signal is removed. In accordance with the preferred embodiment of the invention, repeater cancelers are an adaptive filter that operate in a manner similar to that of echo cancelers. In an echo canceler, for example, there exists a portion of transmit signal at the second line driver 218 (FIG. 3) and the third line driver 262 (FIG. 4) that gets reflected back into receive path at the first line driver 204 (FIG. 3) and the fourth line driver 266 (FIG. 4), respectively, as a result of transformer hybrid 202, 264 imperfections.

In a full duplex echo canceling modem, this signal degrades receiver performance and needs to be removed. This is accomplished with echo cancelers 208, 254. Based on well known procedures and algorithms, the echo cancelers 208, 254 adaptively remove the portion of the receive signal at the first line driver 204 and the fourth line driver 266 that is correlated with the signals at the second line driver 218 (FIG. 3) and the third line driver 262 (FIG. 4), respectively. The inputs to the echo cancelers 208, 254 are digital transmit data at locations A and B, and the output of the analog to digital converters 206 (FIG. 3), 268 (FIG. 4). The echo cancelers 208 (FIG. 3), 254 (FIG. 4) then adaptively find the proper coefficients that minimize the correlation between location A and 300 (FIG. 3), and location B and 400 (FIG. 4).

Operation of the repeater cancelers 212 (FIG. 3), 252 (FIG. 4) is similar to that of the echo cancelers 208 (FIG. 3), 254 (FIG. 4). FIG. 5 is a block diagram further illustrating the first 201 and second 203 parts of the repeater 200 and their relationship with a power feed network 504, wherein the power feed network 504 comprises the switches 152, 154 (FIG. 2) and tone through capacitors 142, 146 (FIG. 2). Referring to FIG. 5, in the repeater 200, there exists a portion of the transmit signal from the first part 201 of the repeater 200 and the second part 203 of the repeater 200 that is coupled into the second part 203 of the repeater 200 and the first part 201 of the repeater 200 respectively, as a result of imperfections in the power feed network 504. This coupled signal degrades repeater performance. Repeater performance can be improved if the coupled signal is removed at point 301 in FIG. 3 and point 401 in FIG. 4.

Looking at the signal path from the first part 201 to the second part 203, for example, the transmit signal originating at point A (FIG. 3), travels through blocks 214, 216, 218 and 202 and is coupled via the power feed network 504 (FIG. 5) into the receive path at blocks 264 266 and 268 (FIG. 4). Since point A is received data from the second part 203 of the repeater 200, this data can be used to adaptively remove the coupled signal at point 401 (FIG. 4). This is accomplished by first delaying the data symbols from a second receive processor 269 via the second bulk delay 251. This delay matches the delay through blocks 214, 216, 218, 202, 504, 264, 266 and 268, and is necessary to make the repeater canceler 252 (FIG. 4) a causal filter.

After delaying the data, the data is then fed to the repeater canceler 252 (FIG. 4), which then adaptively finds proper coefficients in block 252 that will minimize the correlation between points A and 401. The coefficients are then used in the same manner as is performed by an echo canceler, which is known by those skilled in the art. Specifically, the repeater canceler coefficients are the result of the adaptive process, which minimizes the correlation, as described above. These coefficients are then used as taps of a finite impulse response filter, for example, which produces an output that is subtracted from points 300 and 400 with input from 224 and 251, respectively. The operation of the repeater 200 in the direction from the second part of the repeater 203 to the first part of the repeater 201 is identical to that described above.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A cancellation system for providing cancellation of interference in a repeater, located between a first endpoint and a second endpoint, comprising:
   an echo canceler for canceling echo within said system;
   a repeater canceler logically connected to said echo canceler, wherein said repeater canceler cancels coupled signals within said system, wherein said repeater canceler cancels coupled signals by using a data signal transmitted from said second end point to said first endpoint and outputs a second signal;
   a bulk delay device that provides a delay to said data signal prior to said data signal being received by said repeater canceler, and wherein said coupled signals are caused by at least one tone through capacitor located within said system that assures proper signal continuity from said first endpoint to said second endpoint.

2. A cancellation system for providing cancellation of interference in a repeater, located between a first endpoint and a second endpoint, comprising:
   an echo canceler for canceling echo within said system;
   a repeater canceler logically connected to said echo canceler, wherein said repeater canceler cancels coupled signals within said system, and wherein said coupled signals are caused by at least one switch located within said system that provides downstream power to a second system located between said first endpoint and said second endpoint.

3. The system of claim 2, wherein said first endpoint is a central office and said second endpoint is a customer premise.

4. The system of claim 2, wherein said coupled signals are caused by at least one tone through capacitor located within said system that assures proper signal continuity from said first endpoint to said second endpoint.

5. The system of claim 2, wherein said repeater canceler cancels coupled signals by using a reference signal, wherein said reference signal is a data signal transmitted from said second endpoint to said first endpoint.

6. The system of claim 5, wherein said data signal is derived from a second repeater canceler that determines a series of proper coefficients for use in minimizing coupled signals resulting from data transmission from said second endpoint to said first endpoint.

7. The system of claim 2, further comprising a bulk delay device, wherein said bulk delay device provides a delay to a data signal being transmitted via said system before said data signal is transmitted to said repeater canceler.

8. A method of canceling interference in a repeater located between a first endpoint and a second endpoint, comprising the steps of:
   providing a first and second communication path in said repeater;
   amplifying a data signal received from said first endpoint, wherein said data signal is carried through said repeater in said first communication path;
   removing local echo from said amplified data signal;
   removing coupled signals from said amplified data signal, wherein the coupled signals are caused by said second communication path; and
   transmitting said data signal to said second endpoint.

9. The method of claim 8, further comprising the step of converting said amplified signal from an analog signal to a digital signal prior to said step of removing local echo, and converting said amplified signal from a digital signal to an analog signal after said step of removing coupled signals introduced by said repeater.

10. The method of claim 8, wherein said coupled signals are caused by at least one tone through capacitor located within said repeater that assures proper signal continuity from said first endpoint to said second endpoint.

11. The method of claim 8, wherein said first endpoint is a central office and said second endpoint is a customer premise.

12. The method of claim 8, wherein said coupled signals are caused by at least one switch located within said repeater that provides downstream power to a second repeater located between said first endpoint and said second endpoint.

13. The method of claim 8, wherein said step of removing coupled signals is performed by using a reference signal, wherein said reference signal is a data signal transmitted from said second endpoint to said first endpoint.

14. The method of claim 13, wherein said reference signal is derived by the step of determining a series of proper coefficients for use in removing said coupled signals resulting from data transmission from said second endpoint to said first endpoint.

15. The method of claim 8, further comprising the step of delaying said amplified signal after said step of removing local echo and prior to said step of removing said coupled signals.

16. A system for providing cancellation of interference in a repeater, located between a first endpoint and a second endpoint, comprising:
   means for amplifying a data signal received from said first endpoint;
   means for providing a first communication path through said repeater, wherein said first communication path carries said amplified data signal;
   means for providing a second communication path through said repeater;
   means for removing local echo from said amplified data signal;

means for removing coupled signals from said amplified data signal, wherein said coupled signals are caused by said second communicative path means; and means for transmitting said data signal to said second endpoint.

17. The system of claim 16, further comprising a means for converting said amplified signal from an analog signal to a digital signal prior to removing local echo, and a means for converting said amplified signal from a digital signal to an analog signal after removing coupled signals introduced by said repeater.

18. The system of claim 16, wherein said coupled signals are caused by at least one tone through capacitor located within said repeater that assures proper signal continuity from said first endpoint to said second endpoint.

19. The system of claim 16, wherein said first endpoint is a central office and said second endpoint is a customer premise.

20. The system of claim 16, wherein said coupled signals are caused by at least one switch located within said repeater that provides downstream power to a second repeater located between said first endpoint and said second endpoint.

21. The system of claim 16, wherein said means for removing coupled signals uses a reference signal, wherein said reference signal is a data signal transmitted from said second endpoint to said first endpoint.

22. The system of claim 21, wherein said data signal is derived by a means for determining a series of proper coefficients for use in removing said coupled signals resulting from data transmission from said second endpoint to said first endpoint.

23. The system of claim 16, further comprising a means for delaying said amplified signal after removing local echo and prior to removing said coupled signals.

24. A signal repeater located between a first endpoint and a second endpoint, the signal repeater receiving a signal from the first endpoint and transmitting the signal to the second endpoint, the repeater comprising:

a first signal processor having a first receive communication path and a first transmit communication path, wherein the first signal processor receives the signal and processes the signal along the first receive communication path;

a second signal processor in communication with the first signal processor, the second signal processor having a second receive communication path and a second transmit communication path, wherein the first signal processor receives the signal and processes the signal along the second transmit communication path;

an echo canceler connected to the second receive communication path and the second transmit communication path, wherein the echo canceler receives the signal carried through the second transmit communication path and generates an echo cancellation signal for canceling an echo of the signal in the second receive communication path; and a repeater canceler connected to the first receive communication path, wherein the repeater canceler receives a reference signal related to the signal and generates a crosstalk cancellation signal for canceling in the first receive communication path a crosstalk signal introduced by transmitting the signal from the repeater.

25. The repeater of claim 24, wherein the echo canceler adaptively reduces correlation in signals carried in the second transmit communication path and the second receive communication path.

26. The repeater of claim 25, wherein the echo canceler adaptively determines coefficients for minimizing the correlation between the signal and the echo of the signal.

27. The repeater of claim 24, wherein the repeater canceler adaptively reduces correlation in the signal carried in the first receive communication path and the crosstalk signal.

28. The repeater of claim 27, wherein the repeater canceler adaptively determines coefficients for minimizing the correlation between the signal and the crosstalk signal.

* * * * *